Aug. 24, 1926.  
C. KATZ  
1,597,319  
SUCTION DENTAL DEVICE  
Filed Jan. 11, 1923
Fig. 1.
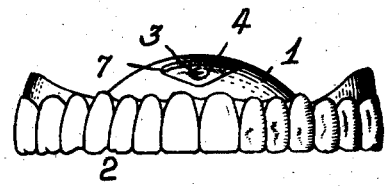
Fig. 2.  Fig. 3.
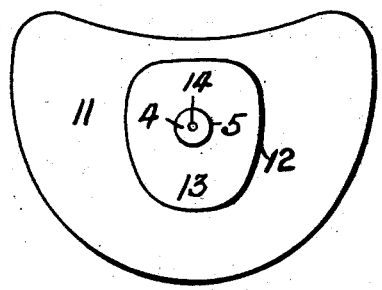 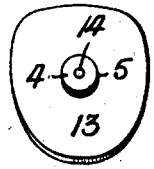
Fig. 4.
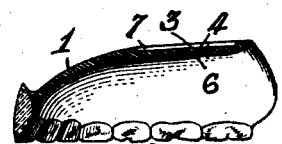
Fig. 5.
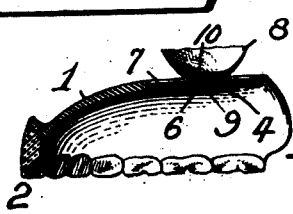
Fig. 8.  Fig. 6.
 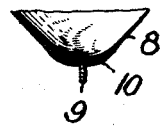
Fig. 7.
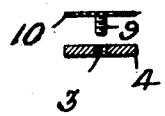
Inventor  
Charles Katz.  
By his Attorney  
Herbert H. Thompson Patented Aug. 24, 1926.

1,597,319

UNITED STATES PATENT OFFICE.

CHARLES KATZ, OF BROOKLYN, NEW YORK.

SUCTION DENTAL DEVICE.

Application filed January 11, 1923. Serial No. 611,915.

This invention relates to suction dental plates such as are used for false teeth for the mouth, and especially to the type of plate where an auxiliary suction device such as a rubber suction cap is employed. While I am aware that many types of auxiliary suction devices have been proposed to hold such plates in place, in all such cases in so far as I am aware, the rubber cups are unsatisfactory, since they deteriorate rapidly and the patient is unable to renew the cup without a dentist's help, thus proving a source of dissatisfaction to both.

One purpose of my invention is to construct such a suction device so that it is readily detachable and may consequently be renewed at will by the patient.

Another object of the invention is to simplify and cheapen the method of manufacturing such plates and suction devices.

Other objects will appear as the description proceeds.

Referring to the drawings in which what I now consider to be the preferred form and method of manufacture of my invention is shown:—

Fig. 1 is a front view of a dental plate constructed according to my invention, and ready to receive the suction cup.

Fig. 2 is a plan view of a mold used for forming the plate, showing a blank in place for producing a threaded hole in the completed plate.

Fig. 3 is a perspective view of such blank.

Fig. 4 is a vertical section of the dental plate, without the suction cup.

Fig. 5 is a similar view showing the suction cup in place.

Fig. 6 is an enlarged section of the cup.

Fig. 7 is an enlarged sectional elevation of the nut and screw which are secured respectively in the plate and cup.

Fig. 8 is a disassembled view of the three parts making up the blank used in forming a plate.

According to my invention, I form the roof of plate 1, which supports the false teeth 2, with a threaded aperture 3 extending preferably only partially through the plate from the top. Owing to the soft character of the plate, and the difficulty of threading an aperture therein, I prefer to embed in the plate a nut 4 which provides the threaded aperture 3. Said nut is preferably knurled or serrated on the edge 5 to assure its remaining fixed in the plate. The top may be flush with the top of the plate at that point, while the bottom is preferably covered by the plate, as at 6. The usual slight cavity or depression may be provided in the top of the plate, if desired, around the nut.

The rubber cup portion 8 is provided with a threaded stem 9 adapted to be screwed into said nut to unite detachably the cup and plate. Said stem is preferably provided with a serrated, flattened head 10 which is firmly held within the central portion of the cup, as by vulcanizing two discs of rubber or other suitable pliable material together with the head 10 between. Preferably a rubber disc is used at least on the top side of the head 10, so that no metal can touch the mouth. It is obvious that the form of connection between the cup and plate may be modified and the method of attaching the cup to the above described plate is as follows. To the surface of the mold 11, I detachably secure, as by nailing, a blank 12 comprising a disc 13 of soft metal, such as tin, a shape to conform to the desired shape of depression 7 desired in the plate. In an aperture in said plate is secured a pin 14 and on said pin is threaded a nut 4. The plate 1 is then molded between the molds in the usual manner, and when the molds are removed the blank 12 and attached parts will ordinarily remain on the plate with nut 4 embedded in the plate, due to the fact that the mold is softened during the vulcanizing process so that the nails pull readily. Disc 13 is then cut from the plate and removed from pin 14, the pin remaining in nut 4 as the nut is formed of much harder metal than disc 13. Said pin may then be readily unscrewed from the nut, leaving the plate as shown in Figs. 1 and 4, ready for the reception of the rubber cup. Said cup may then be screwed in place as shown in Fig. 5.

In accordance with the provisions of the patent statutes, I have herein described the principle of operation of my invention, together with the apparatus, which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having herein described my invention what I claim and desire to secure by Letters Patent is:

The method of making one portion of a suction plate which consists in placing a blank in the mold which has secured thereto a threaded stem and a nut threaded thereon, moulding the plate, removing the blank from the plate, leaving the nut and stem therein, and finally unscrewing the stem from the nut.

In testimony whereof I have affixed my signature.

CHARLES KATZ.